United States Patent [19]

Miller

[11] Patent Number: 5,740,880
[45] Date of Patent: Apr. 21, 1998

[54] SPEED TRACKING OF INDUCED ARMATURE FIELD IN ELECTRIC POWER ASSISTED STEERING

[75] Inventor: John Michael Miller, Saline, Mich.

[73] Assignee: Ford Global Technologies, Inc., Dearborn, Mich.

[21] Appl. No.: 568,729

[22] Filed: Dec. 7, 1995

[51] Int. Cl.$^6$ .............................. H02P 7/00; H02P 5/40; B62D 5/04

[52] U.S. Cl. .................... 180/446; 318/805; 318/806; 318/718; 318/825

[58] Field of Search .................. 364/424.051, 424.052, 364/424.053; 180/400, 443, 444, 445, 446; 318/718, 721, 825, 823, 806, 805, 802, 809, 432

[56] References Cited

U.S. PATENT DOCUMENTS

| | | | |
|---|---|---|---|
| 4,450,398 | 5/1984 | Bose | 318/803 |
| 4,538,698 | 9/1985 | Hashimoto et al. | 180/79.1 |
| 4,621,327 | 11/1986 | Dolph et al. | 364/424.05 |
| 4,666,011 | 5/1987 | Ohe et al. | 180/79.1 |
| 4,715,463 | 12/1987 | Shimizu | 180/79.1 |
| 4,753,309 | 6/1988 | Marumoto et al. | 180/446 |
| 4,837,692 | 6/1989 | Shimizu | 364/424.05 |
| 4,875,539 | 10/1989 | Abukawa et al. | 180/446 |
| 4,885,518 | 12/1989 | Schauder | 318/798 |
| 5,257,828 | 11/1993 | Miller et al. | 180/79.1 |
| 5,334,923 | 8/1994 | Lorenz et al. | 318/805 |
| 5,444,351 | 8/1995 | Yamamura et al. | 318/802 |
| 5,459,386 | 10/1995 | Okachi et al. | 318/727 |
| 5,475,289 | 12/1995 | Mclaughlin et al. | 180/446 |
| 5,481,168 | 1/1996 | Mutoh et al. | 318/432 |
| 5,498,945 | 3/1996 | Prakash | 318/807 |

OTHER PUBLICATIONS

I. Takahashi & T. Noguchi, A New Quick–Response and High–Efficiency Control Strategy of an Induction Motor, *IEEE Transactions on Industry Applications*, vol. IA–22, No. 5, Sep./Oct. 1986.

P. Krein, F. Disilvestro, I. Kanellakopoulos, J. Locker, "Comparative Analysis of Scalar and Vector Control Methods for Induction Motors," *IEEE Transactions on Industry Applications*, 1993.

*Primary Examiner*—Brian L. Johnson
*Assistant Examiner*—Gary Savitt
*Attorney, Agent, or Firm*—Roger L. May; Richard D. Dixon

[57] ABSTRACT

Electric motors having controllable induced armature fields, such as induction motors and synchronous reluctance motors, are used in power assisted steering systems for motor vehicles. Power is conserved by tailoring induced armature fields or rotor flux in accordance with the speeds of motor vehicles including the power assisted steering system. In particular, one or more flux programs or maps are provided for the power assisted steering system with the flux map or program being accessed or addressed by means of the vehicle speed. During low speed operation of the motor vehicle, for example to perform parking maneuvers where speeds are near zero and steering forces are near or at maximum, the rotor flux is programmed to maximum. For high speed operation, such as highway and rural motor vehicle operation, the rotor flux is programmed to a low value so that internal loss mechanisms in the power assist motor and motor controller are minimized yet provide sufficient rotor flux to meet steering needs such as lane changes, obstacle avoidance and the like. Various transition speeds and flux transition curves provide smooth transitions between high flux levels and low flux levels.

34 Claims, 3 Drawing Sheets

SPEED TRACKING OF INDUCED ARMATURE FIELD IN ELECTRIC POWER ASSISTED STEERING

BACKGROUND OF THE INVENTION

The present invention relates in general to power steering systems using an electric motor to produce auxiliary steering force for augmenting the torque applied to a steering wheel by an operator of a motor vehicle and, more particularly, to the use of electric motors having controllable induced armature fields, such as induction motors and synchronous reluctance motors, and the control of the induced armature fields in such motors to reduce the power consumed by the power steering systems.

Electric power assisted steering (EPAS) is being developed to improve steering control capabilities, reduce system costs and, at least in part, to improve fuel economy over power assisted hydraulic systems. A wide variety of electric motors are available for use in EPAS ranging from permanent magnet brushed and brushless, to switched and synchronous reluctance, to induction motors. Physical size favors the permanent magnet motor while cost favors the reluctance and induction motors. Smoothness of operation also favors synchronous reluctance and induction motors since EPAS should not introduce extraneous "noise" and vibration into the steering wheel and switched reluctance motors tend to have more torque ripple than desired for use in EPAS.

While cost and smoothness of operation favor synchronous reluctance and induction motors over other motors available for EPAS, synchronous reluctance motors and induction motors require the provision of external power to energize or maintain the flux in the armature or rotor of the motor. Accordingly, if synchronous reluctance motors and/ or induction motors are to be used for EPAS, there is a need to reduce the energy consumed by these motors for armature or rotor excitation.

SUMMARY OF THE INVENTION

This need is met by the invention of the present application wherein electric motors having controllable induced armature fields, such as induction motors and synchronous reluctance motors, are used in power assisted steering systems for motor vehicles. Power is conserved by tailoring induced armature fields or rotor flux in accordance with the speed of a motor vehicle including the power assisted steering system. In particular, one or more flux programs or maps are provided for the power assisted steering system with the flux map or program being accessed or addressed by means of the vehicle speed. During low speed operation of the motor vehicle, for example to perform parking maneuvers where speeds are near zero and steering forces are near or at maximum, the rotor flux is programmed to maximum. For high speed operation, such as highway and rural motor vehicle operation, the rotor flux is programmed to a low value so that internal loss mechanisms in the power assist motor and motor controller are minimized yet provide sufficient rotor flux to meet steering needs such as lane changes, obstacle avoidance and the like. Various transition speeds and flux transition curves provide smooth transitions between high flux levels and low flux levels.

In accordance with one aspect of the present invention, a motor driven power assisted steering system for a motor vehicle comprises an electric motor with a controllable induced armature field. A coupler mechanism couples an output shaft of the electric motor to steering gear of a motor vehicle which includes a vehicle speed sensor for detecting the operating speed of the motor vehicle and for generating representative speed signals. A motor controller responsive to the speed signals controls the induced armature field of the electric motor as a function of the operating speed of the motor vehicle. The electric motor may be an induction motor or a synchronous reluctance motor.

It is, thus, a feature of the present invention to provide an improved power assisted steering for motor vehicles wherein power assistance is provided by electric motors having controllable induced armature fields and to reduce power consumption in those motors by programming induced armature fields or rotor flux in accordance with the speeds of motor vehicles including the power assisted steering systems.

DETAILED DESCRIPTION OF THE INVENTION

Figure 1:
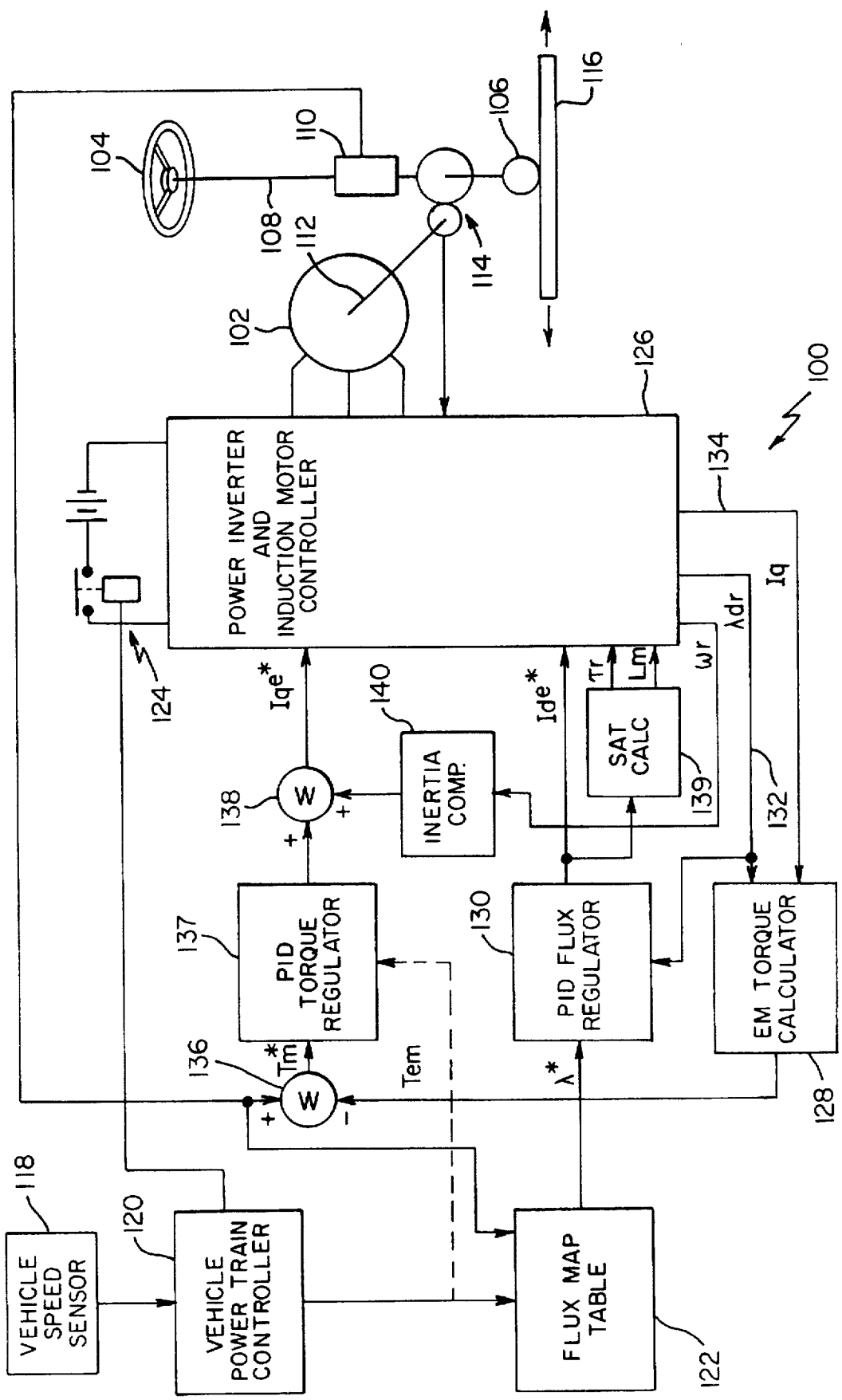
FIG. 1 is a schematic block diagram of an electric power assisted steering (EPAS) system for a motor vehicle in accordance with the present invention.

Reference is now made to FIG. 1 which schematically illustrates an electric power assisted steering (EPAS) system 100 including speed tracking of an induced armature field in a motor 102 which performs steering assistance. The motor 102 has a controllable induced armature field, currently an induction motor is preferred and the invention will be described with reference to an induction motor; however, a synchronous reluctance motor can also be used in the present invention. The system 100 includes a steering wheel 104 which is operatively connected to a pinion gear 106 via a steering shaft 108. A torque sensor 110 is coupled to the steering shaft 108 to measure the torque Tstr applied to the steering wheel 104 by an operator of the motor vehicle including the system 100.

The motor 102 includes an output shaft 112 which is coupled to the steering shaft 108 via a gear set 114. The pinion gear 106, which is driven by the steering shaft 108, engages and drives a linear steering member or rack 116 which is connected to steerable wheels (not shown) in a conventional manner.

A conventional vehicle speed sensor 118, coupled to a transmission or one or more of the wheels of the vehicle including the system 100, generates vehicle speed information signals which are connected to a vehicle power train controller 120. The power train controller 120 processes the vehicle speed information signals to generate speed dependent address signals for a flux map table 122 which includes at least one speed dependent flux program or map for operation of the motor 102 as will be described.

The controller 120 also generates a power steering command signal which operates a relay 124 to activate or deactivate the EPAS system 100 by connecting or disconnecting power from a power inverter and induction motor controller 126. This allows the EPAS system 100 to operate with the ignition off or the engine stalled unlike hydraulic systems which it replaces. In addition, it permits the vehicle power train controller 120 to disconnect the EPAS system 100 in the event of failure within the system 100.

The power inverter and induction motor controller 126 includes sensors for determining the flux waveform $\lambda dr$ in the rotor of the motor 102, the quadrature current Iq and/or for monitoring the speed $\omega r$ and the torque Tr of the output shaft 112 of the motor 102 via sensors associated with the gear set 114 or otherwise associated with the motor 102 or the output shaft 112. The flux waveform $\lambda dr$ is passed to an electromagnetic (EM) torque calculator 128 and a proportional-integral-derivative (PID) flux regulator 130 via a conductor 132. The PID flux regulator generates a flux command signal $I_d^{e*}$.

The EM torque calculator 128 also receives the quadrature current Iq via a conductor 134. To determine the EM torque, the torque calculator 128 executes the function:

$$Tem=(3/2)(P/2)(Lm/Lr)\lambda dr Iq (Nm)$$

where P is the number of poles of the motor 102, Lm is the magnetizing inductance of the motor 102 and Lr is the rotor inductance of the motor 102. No friction effects are included in the Em torque calculator.

The torque Tstr applied to the steering wheel 104 by an operator of the motor vehicle including the system 100 as sensed by the torque sensor 110 is passed to a summer 136. The summer 136 also receives the EM torque Tem calculated by the EM torque calculator 128 and subtracts the EM torque Tem from the sensed torque Tstr. The resulting error signal is passed to a PID torque regulator 137 which generates a requested torque signal and passes it to a summer 138.

A saturation calculator 139 estimates a rotor flux time constant $\tau r = Lr/Rr$, i.e., rotor inductance over rotor resistance and magnetizing inductance Lm based on the equation:

$$\lambda dr(Id^{e*}) = a1(1-exp(-a2*Id^{e*}))$$

$$Lm = \lambda dr(Id^{e*})/Id^{e*}$$

$$\tau r = Lr(Id^{e*})/R2$$

where a1 and a2 are constants and R2 is temperature dependent resistance of the rotor. For a 500 watt induction motor used in a working embodiment of the present invention, a1=0.05, a2=0.035 and R2=0.018@25° C. It is noted that the estimates generated by the saturation calculator 139 are used by the EM torque calculator 128.

An inertia compensator 140 receives the speed $\omega r$ of the output shaft 112 of the motor 102 to generate a signal representative of the inertia of the rotor of the motor 102 which is coupled to the steering shaft 108 via the gear set 114. The presence of the rotor inertia will be felt in the steering wheel 104 just as the added inertia of an air bag in the steering wheel 104. The inertia compensator 140 uses estimated rotor acceleration which is derived by taking the derivative of the estimated rotor speed, i.e., the speed $\omega r$ of the output shaft 112 of the motor 102, and multiplies the estimated rotor acceleration by motor inertia with the result being added to the requested torque signal by the summer 138 to generate the torque command signal $I_q^{e*}$ which is passed to the power inverter and induction motor controller 126.

Basic operating control of the motor 102, whether an induction motor as illustrated or a synchronous reluctance motor, is in accordance with well known operating techniques such as field orientation control and various scalar control methods so that only the power inverter and induction motor controller 126 of FIG. 1 will be further described herein for clarification of the invention of the present application. In accordance with the present invention, the induced field of the armature or rotor of the motor 102 is controlled in accordance with a speed dependent flux program or map contained within the flux map table 122.

By using an induction motor or synchronous reluctance motor in the EPAS system, constant excitation of the motor armature or rotor is required via a power inverter in order to maintain the rotor flux level active and ready for instant response. It is important to maintain a high flux level at low speed for example to assist in parking and other low speed maneuvers. At high speeds, a high flux level is not required. Since a small motor of 200 to 500 watts at the shaft can be used in the EPAS system 100 and such motors have small rotor flux time constants on the order of 30 to 90 milliseconds, in accordance with the invention of the present application, rotor flux is tailored in accordance with the speed of the vehicle including the system 100.

The flux map table 122 thus associates a vehicle speed V with an appropriate operating rotor flux level $\lambda dr$ for the motor 102 of the EPAS system 100 and includes at least one flux program for that purpose, i.e., operation of the motor 102. Preferably, the flux map table 122 is programmed to contain a number of flux programs which depend on driver demographics and/or usage. The flux programs can then be selected based on a given driver and can be changed if a vehicle including the EPAS system 100 is driven by a number of different people or for a number of different purposes or is sold to a new owner.

When field oriented controllers or some scalar controllers are used in the power inverter and induction motor controller 126, detuning effects are minimized by inclusion of the saturation calculator described above. With motor saturation accounted for, the nonlinear flux characteristic $\lambda dr(Id^e)$ and its impact on magnetizing inductance Lm, on stator and rotor inductance Ls and Lr, and on calculations based on these parameters, such as $\tau r$ and Tem, are then representative of actual motor behavior.

Figure 2:
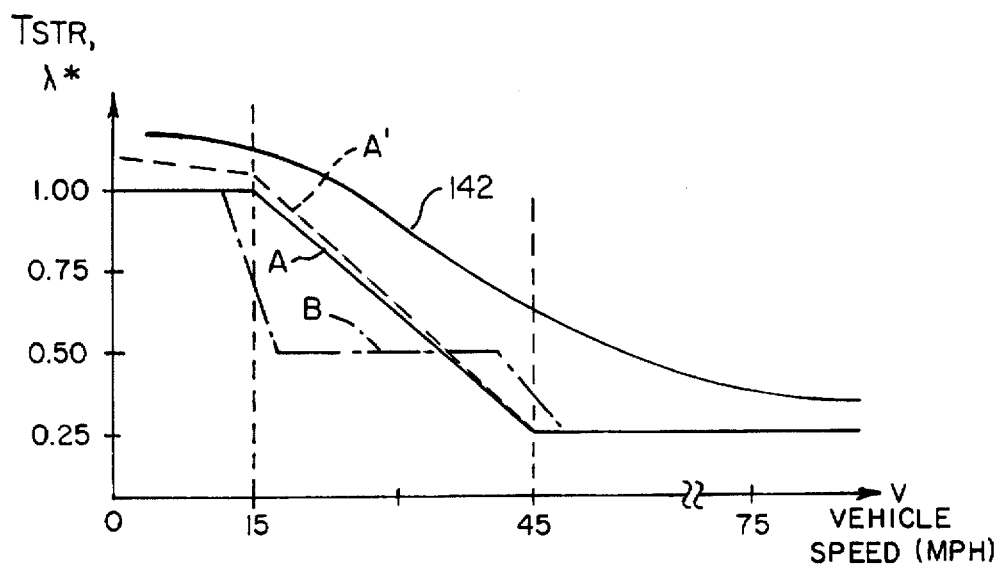
FIG. 2 is a graph of flux programs or maps and a steering torque curve for the EPAS system of FIG. 1.

Two exemplary flux programs are shown in FIG. 2. A vehicle which spends most of its time in commuter service would benefit from a more rapid transition to different flux levels as represented by flux program B. Alternately, a vehicle used in business such as postal delivery, police patrol, municipal utilities and the like which do not spend any protracted time at any given speed would benefit from higher average flux levels in the motor as represented by flux program A.

During low speed operation, for example to perform parking maneuvers where speeds are near zero and steering rack forces are near or at maximum, the rotor flux is programmed to maximum. This results in the motor 102 providing torque at a high torque/amp value. At intermediate speeds, for example 15 miles per hour (MPH) to 45 MPH corresponding to urban driving, the flux can be reduced to some intermediate value as in flux program B or progressively reduced to a minimum value as shown in flux program A. At speeds above 45 MPH which roughly corresponds to highway driving and rural operation, the EPAS duty cycle is low, especially for cross country cruise and mostly straight ahead driving, the goal of the EPAS system 100 is to reduce energy expended. For the EPAS system 100, this translates into holding the magnetizing current to a low value so that internal loss mechanisms in the motor 102 and power transistors of the power inverter and induction motor controller 126 are minimized yet provide sufficient rotor flux to meet steering needs such as lane changes, obstacle avoidance and the like.

It should be apparent that with rotor flux reduced to approximately 25% of maximum that if high motor torque is commanded, within a boost gain specification curve 142 of steering, that commanding motor torque current to 100% can be handled by the inverter and the motor. During such a transient control situation, the motor 102 responds quickly. If the transient need continues, the flux map table 122 can be supplemented to increase commanded rotor flux by means of a steering torque feedforward command. For example, the flux map table 122 could include an integrator for processing the steering torque Tstr and adding it to the value read from the flux program currently being used.

Figure 3:
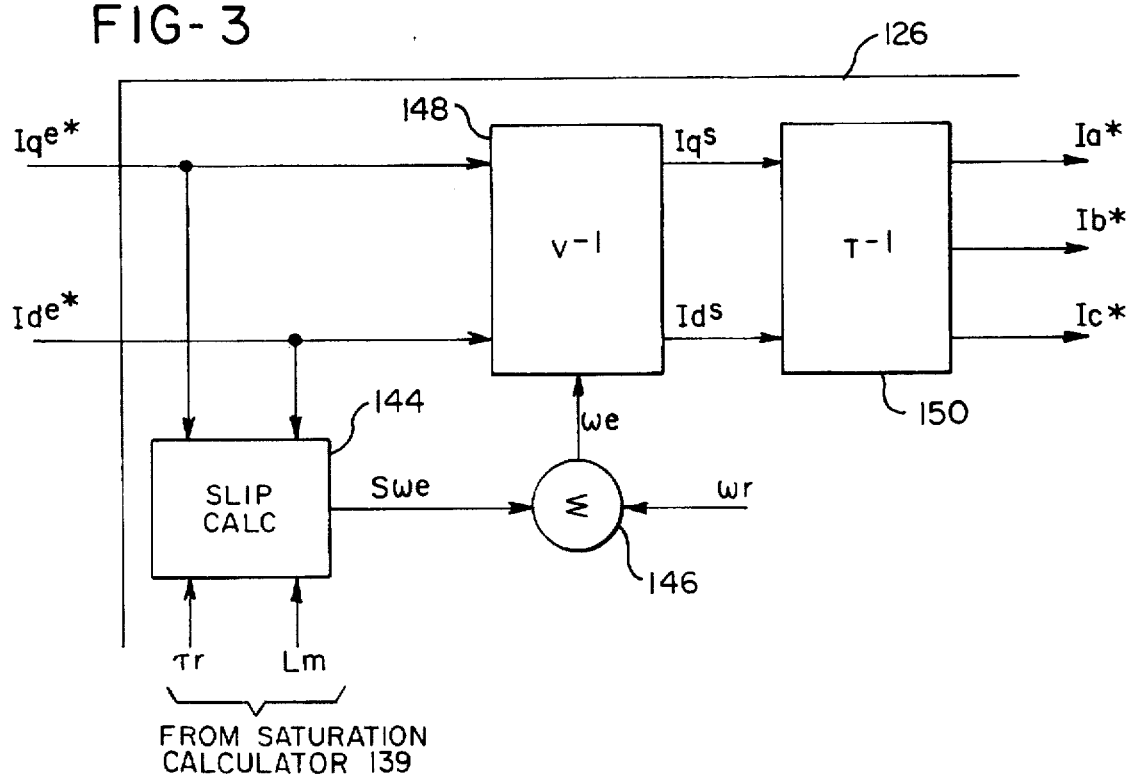
FIG. 3 is a schematic block diagram of a portion of the power inverter and induction motor controller of FIG. 1.

To clarify operation of the present application, a description will now be made of how the flux programs of the flux map table 122 tailor steering assist torque according to speed and/or driver preference when an induction motor is used as the motor 102. Reference is made to FIG. 3 which illustrates in schematic block diagram form a portion of the power inverter and induction motor controller 126 which includes a slip calculator 144. The slip calculator 144 receives both the torque command signal $I_q^{e*}$ and the magnetizing or flux command signal $I_d^{e*}$ with a resulting slip gain being a function of these command signals and the magnetizing inductance Lm and rotor flux time constant τr=Lr/Rr, i.e., rotor inductance over rotor resistance, both understood to be subject to saturation effects which can be compensated to some extent by the saturation calculator 139 as illustrated.

For example, in a working embodiment of the invention with a 500 watt induction motor, if the induction motor parameters are constant, with a magnetizing current Ids of approximately 40 amps the slip gain ks=0.37 rad/s/amp and a resulting slip Sωe=ks * Iq is summed with the actual rotor speed ωr by a summer 146 to generate the inverter electrical frequency we which is passed to a rotator 148 which converts synchronous frame signals to stationary frame signals. The output of the rotator 148 is passed to a 2-phase to 3-phase transform 150. The actual slip is then the slip that maintains field orientation for the given speed-torque operating point of the motor 102.

Figure 4:
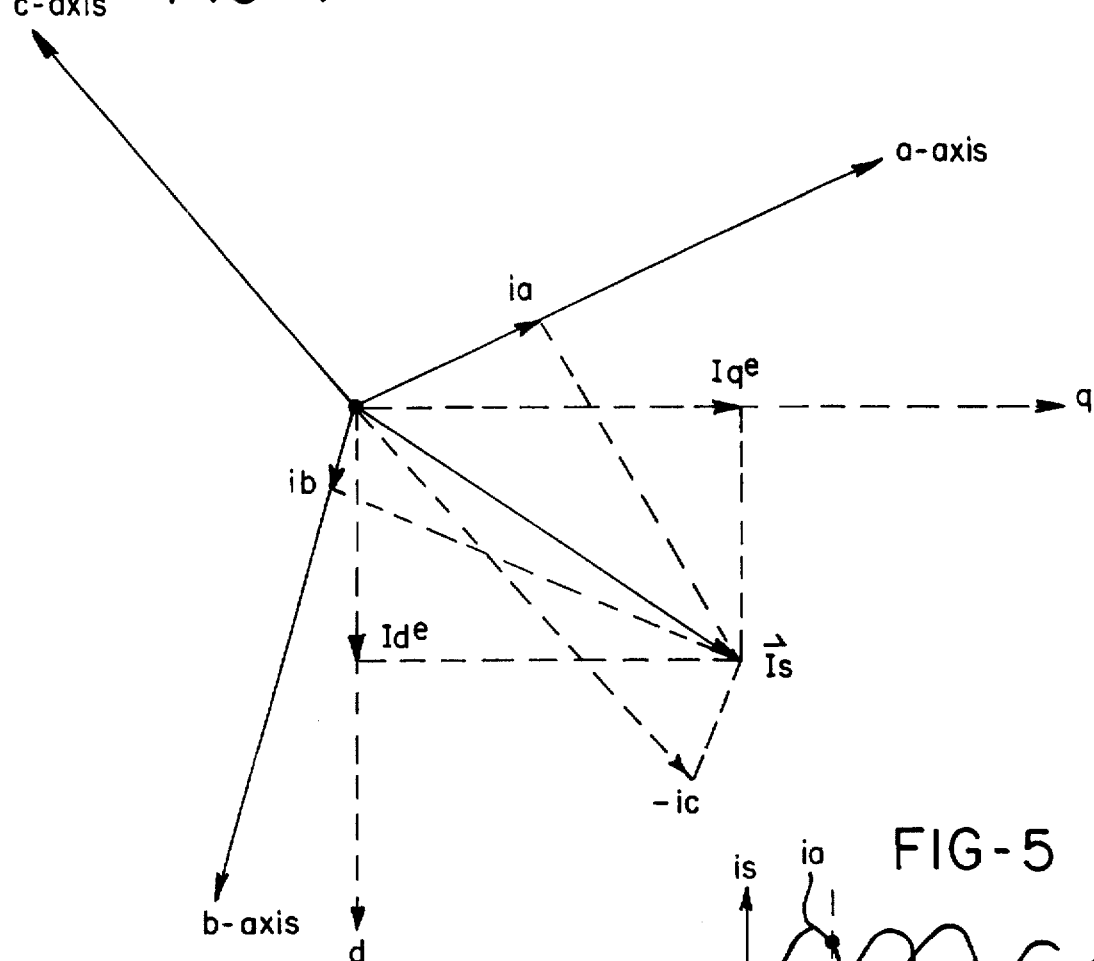
FIG. 4 is a vector diagram illustrating the three phase stator currents of FIG. 5.
Figure 5:
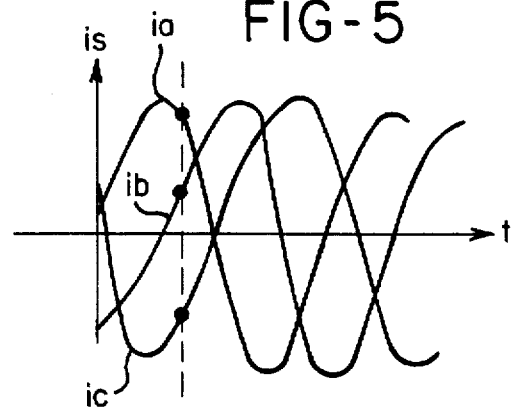
FIG. 5 is a graph of three phase stator currents in an induction motor.

With reference to FIGS. 4 and 5, the induction motor responds to both the inverter current vector Is and the slip Sωe to produce torque Tm=kt * Iq on the output shaft 112. For a working embodiment with a 500 watt induction motor, the actual torque constant kt was kt=0.07 Nm/Amp so that the shaft torque Tm=0.07 * Iq Nm. If the slip angle is changed, for example by limiting rotor flux by means of a flux program in the flux map table 122 according to vehicle speed, then the rotor flux is constrained to be less than the maximum air gap flux (peak flux/amp operation) and the magnetizing component of motor current is limited resulting in reduced overall losses and more efficient operation during highway driving and rural operation.

The slip calculator determines slip Sωe using the equation $$Sωe = Iqs/(τr * Ids*) = (Lm/(τr * λdr))*Iqs.$$

Figure 6:
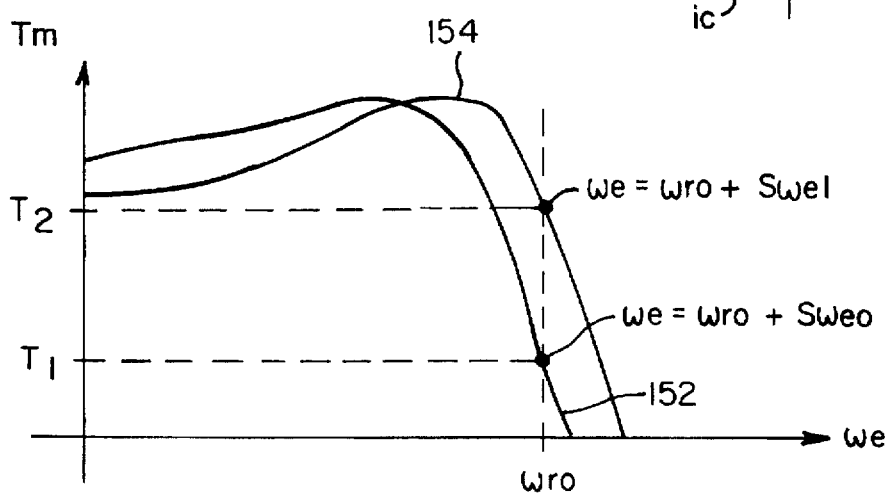
FIG. 6 is a graph illustrating two slip curves for the induction motor of FIG. 1.

When Ids*=40 amps for the noted induction motor, then ks≅0.37 rad/s/amp. If the motor is operating at torque T1 on a slip curve 152 at a certain motor speed ωr0 and more motor torque T2 is needed, then the inverter frequency Sωe jumps to a higher value Sωe1 such that the induction motor is operating higher up on a slip curve 154, see FIG. 6. Similar operation occurs for any rotor speed ωr and commanded torque Tm*. Motor slip and developed torque are linked through the slip calculator instantaneously.

By flux programming according to vehicle speed, the induction motor slip gain characteristic is effectively constrained by the flux programs in the flux map table 122. For example, at low speeds encountered for example during parking, the rotor flux is set to the maximum air gap flux possible for maximum torque per amp. In this case, the magnetizing or flux current is not limited until some high value, e.g., 80 amps, is reached. If maximum air gap flux is maintained during low torque demands, e.g., during highway driving and rural operation, then motor copper losses would be excessive. Accordingly, the flux level is controlled according to a flux program in the flux map table to provide sufficient motor torque capability when needed but to hold down motor losses.

It is also possible to make the flux programs adaptive to further modify the flux command so as to counteract temperature effects resulting in changes in the rotor time constant and hence slip gain. As an example, see the adaptive flux program A' in FIG. 2.

Having thus described the invention of the present application in detail and by reference to preferred embodiments thereof, it will be apparent that modifications and variations are possible without departing from the scope of the invention defined in the appended claims.

What is claimed is:

1. A motor driven power assisted steering system for a motor vehicle comprising:

an electric motor with a controllable induced armature field;

a coupler mechanism for coupling an output shaft of said electric motor to steering gear of a motor vehicle;

a vehicle speed sensor coupled to said motor vehicle for detecting the operating speed of said motor vehicle and for generating representative speed signals; and a motor controller responsive to said speed signals for controlling the induced armature field of said electric motor as a function of the operating speed of said motor vehicle, said motor controller operating along a flux versus vehicle velocity curve to reduce power consumed by said electric motor, said flux versus vehicle velocity curve having a maximum value for a range of low vehicle speeds, a minimum value for a range of high vehicle speeds and a smooth transition between said range of low vehicle speeds and said range of high vehicle speeds.

2. A motor driven power assisted steering system for a motor vehicle as claimed in claim 1 wherein said electric motor comprises an induction motor.

3. A motor driven power assisted steering system for a motor vehicle as claimed in claim 1 wherein said electric motor comprises a synchronous reluctance motor.

4. A motor driven power assisted steering system for a motor vehicle comprising:

an electric motor with a controllable induced armature field;

a coupler mechanism for coupling an output shaft of said electric motor to steering gear of a motor vehicle;

a vehicle speed sensor coupled to said motor vehicle for detecting the operating speed of said motor vehicle and for generating representative speed signals; and a motor controller responsive to said speed signals for controlling the induced armature field of said electric motor as a function of the operating speed of said motor vehicle, said motor controller including a flux versus velocity curve comprising at least two piecewise continuous portions wherein the velocity of said flux versus velocity curve is the velocity of said motor vehicle.

5. A motor driven power assisted steering system for a motor vehicle as claimed in claim 4 wherein said flux versus velocity curve comprises an initial portion extending between a zero velocity and a first velocity and passing through a fixed maximum point of flux.

6. A motor driven power assisted steering system for a motor vehicle as claimed in claim 5 wherein said flux versus velocity curve comprises a second portion wherein said flux decreases at a first rate from said fixed maximum flux to a reduced intermediate flux and extending between said first velocity and a second velocity greater than said first velocity.

7. A motor driven power assisted steering system for a motor vehicle as claimed in claim 6 wherein said flux versus velocity curve comprises a third portion wherein said flux is maintained at substantially said reduced intermediate flux and extending between said second velocity and a third velocity.

8. A motor driven power assisted steering system for a motor vehicle as claimed in claim 7 wherein said flux versus velocity curve comprises a fourth portion wherein said flux decreases at a second rate less than said first rate from said reduced intermediate flux to a minimum flux and extending from said third velocity to a fourth velocity.

9. A motor driven power assisted steering system for a motor vehicle as claimed in claim 8 wherein said flux versus velocity curve comprises a fifth portion wherein said flux is maintained at substantially said minimum flux and extending from said fourth velocity for velocities greater than said fourth velocity.

10. A motor driven power assisted steering system for a motor vehicle as claimed in claim 9 wherein said first and second rates are substantially linear.

11. A motor driven power assisted steering system for a motor vehicle as claimed in claim 10 wherein said first and third velocities are approximately 5 mph and 15 mph, respectively.

12. A motor driven power assisted steering system for a motor vehicle as claimed in claim 10 wherein said first and third velocities are approximately 15 mph and 45 mph, respectively.

13. A motor driven power assisted steering system for a motor vehicle as claimed in claim 10 wherein said first velocity is within a range of approximately from 5 to 15 mph and said third velocity is within a range of approximately from 15 to 45 mph, respectively.

14. A motor driven power assisted steering system for a motor vehicle as claimed in claim 5 wherein said flux versus velocity curve comprises a second portion wherein said flux decreases at a defined rate from said fixed maximum flux to a minimum flux and extending between said first velocity and a second velocity greater than said first velocity.

15. A motor driven power assisted steering system for a motor vehicle as claimed in claim 14 wherein said flux versus velocity curve comprises a third portion wherein said flux is maintained at substantially said minimum flux and extending from said second velocity for velocities greater than said second velocity.

16. A motor driven power assisted steering system for a motor vehicle as claimed in claim 15 wherein said first and second velocities are approximately 5 mph and 15 mph, respectively.

17. A motor driven power assisted steering system for a motor vehicle as claimed in claim 15 wherein said first and second velocities are approximately 15 mph and 45 mph, respectively.

18. A motor driven power assisted steering system for a motor vehicle as claimed in claim 15 wherein said first velocity is within a range of approximately from 5 to 15 mph and said second velocity is within a range of approximately from 15 to 45 mph, respectively.

19. A method for operating a power assisted steering system for a motor vehicle, said power assisted steering system including an electric motor having an output shaft coupled to steering gear of said motor vehicle and a controllable induced armature field, said method comprising the steps of:

detecting the operating speed of said motor vehicle;

generating speed signals representative of the operating speed of said motor vehicle; and controlling the induced armature field of said electric motor in response to said speed signals as a function of the operating speed of said motor vehicle by operating along a flux versus vehicle velocity curve to reduce power consumed by said electric motor, said step of controlling the induced armature field comprising the steps of:

moving along a low speed portion of said flux versus vehicle velocity curve extending from zero velocity to a first velocity and passing through a maximum point of flux;

moving along an intermediate portion of said flux versus vehicle velocity curve extending from said first velocity to a third velocity which intermediate portion of said curve provides a smooth transition between said low speed portion of said curve and a high speed portion of said curve; and moving along said high speed portion of said flux versus vehicle velocity curve extending upward from said third velocity and passing through a minimum point of flux.

20. A method for operating a power assisted steering system for a motor vehicle, said power assisted steering system including an electric motor having an output shaft coupled to steering gear of said motor vehicle and a controllable induced armature field, said method comprising the steps of:

detecting the operating speed of said motor vehicle;

generating speed signals representative of the speed of said motor vehicle; and controlling the induced armature field of said electric motor in response to said speed signals as a function of a flux versus velocity curve comprising at least two piecewise continuous portions wherein said velocity of said flux versus velocity curve is the velocity of said motor vehicle.

21. A method for operating a power assisted steering system for a motor vehicle as claimed in claim 20 further comprising the step of forming said flux versus velocity curve to extend between a zero velocity and a first velocity and have an initial portion passing through a fixed maximum flux.

22. A method for operating a power assisted steering system for a motor vehicle as claimed in claim 21 further comprising the step of forming said flux versus velocity curve to have a second portion wherein said flux decreases at a first rate from said fixed maximum flux to a reduced intermediate flux and extending between said first velocity and a second velocity greater than said first velocity.

23. A method for operating a power assisted steering system for a motor vehicle as claimed in claim 22 further comprising the step of forming said flux versus velocity curve to have a third portion wherein said flux is maintained at substantially said reduced intermediate flux and extending between said second velocity and a third velocity.

24. A method for operating a power assisted steering system for a motor vehicle as claimed in claim 23 further comprising the step of forming said flux versus velocity curve to have a fourth portion wherein said flux decreases at a second rate less than said first rate from said reduced intermediate flux to a minimum flux and extending from said third velocity to a fourth velocity.

25. A method for operating a power assisted steering system for a motor vehicle as claimed in claim 24 further comprising the step of forming said flux versus velocity curve to have a fifth portion wherein said flux is maintained at substantially said minimum flux and extending from said fourth velocity for velocities greater than said fourth velocity.

26. A method for operating a power assisted steering system for a motor vehicle as claimed in claim 25 further comprising the step of setting said first and second rates to be substantially linear.

27. A method for operating a power assisted steering system for a motor vehicle as claimed in claim 26 further comprising the step of setting said first and third velocities to approximately 5 mph and 15 mph, respectively.

28. A method for operating a power assisted steering system for a motor vehicle as claimed in claim 26 further comprising the step of setting said first and third velocities to approximately 15 mph and 45 mph, respectively.

29. A method for operating a power assisted steering system for a motor vehicle as claimed in claim 26 further comprising the step of setting said first velocity within a range of approximately from 5 to 15 mph and said third velocity within a range of approximately from 15 to 45 mph, respectively.

30. A method for operating a power assisted steering system for a motor vehicle as claimed in claim 21 further comprising the step of forming said flux versus velocity curve to have a second portion wherein said flux decreases at a defined rate from said fixed maximum flux to a minimum flux and extending between said first velocity and a second velocity greater than said first velocity.

31. A method for operating a power assisted steering system for a motor vehicle as claimed in claim 30 further comprising the step of forming said flux versus velocity curve to have a third portion wherein said flux is maintained at substantially said minimum flux and extending from said second velocity for velocities greater than said second velocity.

32. A method for operating a power assisted steering system for a motor vehicle as claimed in claim 31 further comprising the step of setting said first and second velocities to approximately 5 mph and 15 mph, respectively.

33. A method for operating a power assisted steering system for a motor vehicle as claimed in claim 31 further comprising the step of setting said first and second velocities to approximately 15 mph and 45 mph, respectively.

34. A method for operating a power assisted steering system for a motor vehicle as claimed in claim 31 further comprising the step of setting said first velocity within a range of approximately from 5 to 15 mph and said second velocity within a range of approximately from 15 to 45 mph, respectively.

* * * * *